United States Patent
Anderson et al.

(10) Patent No.: US 6,801,475 B2
(45) Date of Patent: Oct. 5, 2004

(54) EXPANDABLE SENSOR ARRAY

(75) Inventors: Charles W. Anderson, Pasadena, MD (US); Charles W. Kerechanin, Burtonsville, MD (US); Daniel J. DeCicco, Pasadena, MD (US); George L. Vojtech, Centreville, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/381,528

(22) PCT Filed: Dec. 4, 2002

(86) PCT No.: PCT/US02/39960

§ 371 (c)(1),
(2), (4) Date: Mar. 26, 2003

(87) PCT Pub. No.: WO03/048737

PCT Pub. Date: Jun. 12, 2003

(65) Prior Publication Data

US 2004/0037167 A1 Feb. 26, 2004

Related U.S. Application Data

(60) Provisional application No. 60/336,589, filed on Dec. 5, 2001.

(51) Int. Cl.[7] .................................................. H04R 1/00
(52) U.S. Cl. ........................................................ 367/173
(58) Field of Search ................................ 367/174, 153, 367/4, 173, 165

(56) References Cited

U.S. PATENT DOCUMENTS

| | | | |
|---|---|---|---|
| 3,019,412 A | 1/1962 | Crawford | |
| 3,398,394 A | 8/1968 | Luehrmann et al. | |
| 3,444,511 A | 5/1969 | Marrow | |
| 3,803,540 A | 4/1974 | Mar et al. | |
| 3,889,230 A * | 6/1975 | Knott et al. | 367/181 |
| 3,893,065 A * | 7/1975 | Lea et al. | 367/152 |
| 3,986,159 A * | 10/1976 | Horn | 367/4 |
| 3,990,123 A | 11/1976 | Stachiw et al. | 9/8 R |
| 4,371,957 A | 2/1983 | Sandoz et al. | 367/3 |
| 4,853,900 A | 8/1989 | Snyderwine | 367/4 |
| 5,027,333 A | 6/1991 | Halling | 367/131 |
| 6,055,214 A * | 4/2000 | Wilk | 367/99 |

FOREIGN PATENT DOCUMENTS

| | | | |
|---|---|---|---|
| JP | 411041027 | * | 2/1999 |
| JP | 0201196843 | * | 7/2001 |
| JP | 02001196843 | | 7/2001 |

OTHER PUBLICATIONS

PCT International Search Report, PCT/US02/39960, mailed Sep. 9, 2003.

* cited by examiner

*Primary Examiner*—Daniel Pihulic
(74) *Attorney, Agent, or Firm*—Albert J. Fasulo, II

(57) ABSTRACT

An expandable sensor array including at least one expandable member movable between an unexpanded stowed state and an expanded deployed state and a plurality of sensors interconnected with the at least one inflatable member and operatively connected to form a sensor array.

43 Claims, 7 Drawing Sheets

33

EXPANDABLE SENSOR ARRAY

CROSS-REFERENCE TO RELATED APPLICATIONS

This application claims the benefit of prior filed co-pending U.S. provisional application No. 60/336,589, filed on Dec. 5, 2001.

STATEMENT OF GOVERNMENTAL INTEREST

This invention was made with U.S. Government support under Navy contract No. N00024-98-D-8124. The U.S. Government has certain rights in the invention.

BACKGROUND OF THE INVENTION

1. Field of the Invention

The present invention relates to an expandable sensor array for use in a variety of applications.

2. Description of Related Art

Underwater sensor arrays typically include a semi-rigid structure or a number of sensors attached to one or more cables. To form a two-dimensional or three-dimensional array using known technology requires building an array piecemeal from multiple cables. For example, in the oil industry, two-dimensional geophysical arrays typically include multiple cables laid on the sea floor. Building an array according to known practices does not easily optimize the placement of sensors to form high gain antennas.

SUMMARY OF THE INVENTION

The present invention provides an expandable sensor array. The array includes at least one expandable member movable between an unexpanded stowed state and an expanded deployed state and a plurality of sensors interconnected with the at least one inflatable member and operatively connected to form a sensor array.

BRIEF DESCRIPTION OF THE DRAWINGS

Objects and advantages of the present invention will be more clearly understood from the following specification when considered in conjunction with the accompanying drawings, in which.

DETAILED DESCRIPTION OF THE PREFERRED EMBODIMENT(S)

Figure 1:
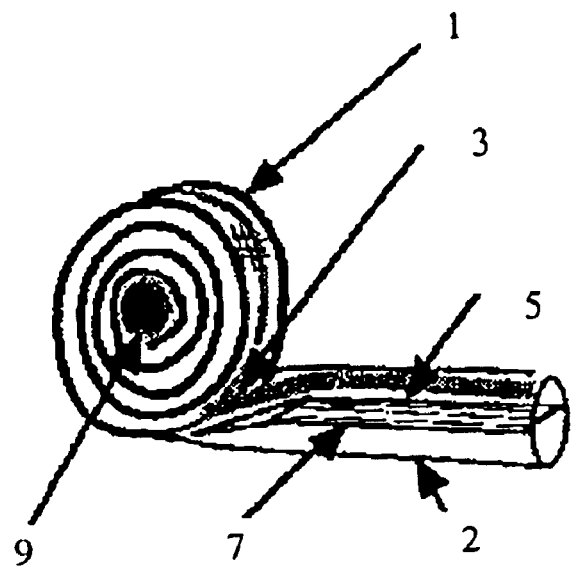
FIG. 1 represents a perspective partial cut-away view of an embodiment of an expandable array according to the present invention as deployment commences.

The present invention provides an expandable structure for supporting a sensor array. The structure may be deployed underwater on the bed of a body of water. The structure may also float between the bed and the surface of a body of water or on the surface. Additionally, the expanding structure could be deployed on land or in outer space.

A structure according to the present invention may be employed in a variety of applications that may take place underwater, on land, or in space. Due to its adaptability, the present invention can permit a favorable configuration to be created and optimized for a particular environment and to carry out a particular function. Another advantage of the present invention is that it provides a structure that is self-assembling or self-deploying in-situ.

An array according to the present invention may include any type of sensor. Along these lines, the sensors may include one or more acoustic, hydrodynamic, geologic, and/or biological sensors. Particular examples of possible sensors include hydrophones, thermistors, pressure sensors, accelerometers, and geophones. According to one embodiment, the array and the sensors form an antenna.

An array according to the present invention includes one or more expandable members. The expandable members are moveable between an unexpanded, stowed state and an expanded, deployed state. The expandable member(s) may have a variety of constructions. Typically, the expandable member(s) includes a flexible shell. Depending upon the embodiment, the shell may have water and/or gas tight properties. The water and/or gas tight properties may be provided by the material that the expandable member(s) are made of, or the material may be treated to provide the water and/or gas tight properties. The material typically has sufficient pliability to permit it to be stowed in the unexpanded state. However, in some embodiments, the material may be less pliable, with joints permitting the member(s) to move between an expanded and an unexpanded state. If necessary, the material could withstand a pressure differential between the interior of the expandable members and the environment exterior to the expandable members. In some cases, the expandable members may be subjected to and be made of a material and with such a construction to withstand pressure differences of about 110 pounds per square inch or more, resulting in a fairly rigid structure.

In some cases, the material may be water soluble where the array is deployed in or on a body of water and it is desired that the array have a limited live span. Alternatively, the array could have a much longer life span, such as on the order of about twenty years or more. Other embodiments deployed in such circumstances may be made of a material that is self-hardening in sea water. For example, using accretion methods, sodium or calcium in sea water could serve as a catalyst for hardening the expandable structure. Such methods are described in U.S. Pat. Nos. 4,246,075 and 4,440,605, for example. The hardening could take place over a period of time such as two weeks to a month. In some embodiments, pumping silty water or providing ventilation slits in the members would allow silt to filter in after deployment on the sea floor where the added mass would hold the arrays in place.

The expandable members may be expanded by different means. For example, the expandable member(s) could be inflatable. The expansion could take place by introducing one or more inflating medium into the expandable members. Typically, the inflating medium includes one or more fluids. The fluids could include one or more gasses and/or liquids.

The fluid(s) introduced may vary, depending upon the application. Along these lines, if the array is deployed under water, then the inflating fluid would typically include water and/or another liquid. Liquid would also be suitable for inflation on land. On the other hand, if the array is to be deployed on the surface of a body of water, on land, in the air, or in space, the inflating medium typically includes one or more gasses.

The amount of inflating medium introduced into the expandable member(s) typically is sufficient to deploy the entire structure and to inflate the expandable member(s) to a desired shape. The amount of inflating medium necessary to carry out these functions may vary, depending upon the size and complexity of the array and the deployment location. Along these lines, a compound structure with multiple branches or a three-dimensional array may require a higher pressure of inflating medium to completely deploy the array.

One or more pumps may introduce the inflating medium into the expandable member(s). The pump(s) may be located on the array. Alternatively, the pump(s) may be arranged remote from the array and one or more conduits may connect the pump(s) to one or more expandable member(s). In some embodiments, multiple pumps may be arranged at various locations to facilitate introduction of inflating medium into the expandable member(s). Other embodiments may include one or more openings where inflating medium may be introduced. The expandable members may each include one or more orifices and/or tubes for receiving inflating medium. The embodiment shown in FIG. 2 includes an inflation tube 15. As inflation medium fills the tube the members expand to form structures such as shown in FIG. 3

The array may include a source of inflating medium. The source of inflating medium may be located in the vicinity of or on the array or remote from the array, such as on a ship. Alternatively, the source of inflating medium may come from the environment where the array is deployed, such as sea water from the sea. The size and pressure capacity of the pump(s) may vary, depending upon the size of the array and environment where it is deployed. Higher pressure on various trunks and branches of the array when inflated may help to provide a desired degree of stiffness to hold an array's shape.

Rather than moving the expandable member(s) from a stowed state to a deployed state by introducing inflating medium into the expandable member(s), the expandable members may include other means for expanding the expandable member(s). For example, one or more self-expanding materials could be arranged in at least a portion of the interior of the expandable member(s). "Self-expanding materials" are meant to include materials that may be restrained in one position and when released return to the shape that the materials were in prior to being restrained. Alternatively or additionally, the expandable member(s) could be made of such a material. Furthermore, inflatable expandable members may also include self-expanding materials.

One example of self-expanding materials that may be employed according to the present invention is open-celled foam materials. Such material are similar to foam materials used in camping mattresses. Such materials could form any portion or the entire portion of an expandable member. According to one embodiment, the expandable material includes an outer shell filled with open-celled foam material. The amount of open-celled foam material included in an expandable member typically is sufficient to move an expandable member from a stowed to a deployed state, either alone or acting in conjunction with other elements, such as inflating medium, an expanding frame, and/or other elements. Open-cell foam may allow the expanded members to fill with any surrounding medium, whether water, air, or vacuum, without losing the final shape.

An expanding frame could include one or more metal, plastic and/or other members that also tend to cause the expandable member to move from a stowed state to a deployed state. Frame members could be arranged outside and/or inside an expandable member. Frame member(s) could also be arranged within a shell of an expandable member.

Regardless of how the expandable members expand, they may have a variety of cross-sectional shapes and/or varying cross-sectional shapes and areas. For example, the cross-sectional area of an expandable member may decrease distally and/or the shape could change. On the other hand, the cross-section and/or the shape could remain substantially constant along their entire lengths. The expandable members may have any functional shape. For example, the expandable members could have a circular cross-sectional shape. Alternatively, the expandable members could have any other suitable cross-sectional shape. A triangular or pear-shaped cross-sectional shape or any shape that is widest at its base may provide more stability to the array.

FIG. 1 illustrates an array that includes an expandable member that has a circular cross-sectional shape. Initially, the array is flattened and rolled in a coil. The array unrolls and forms a circular cross-section when expanded.

Figure 2:
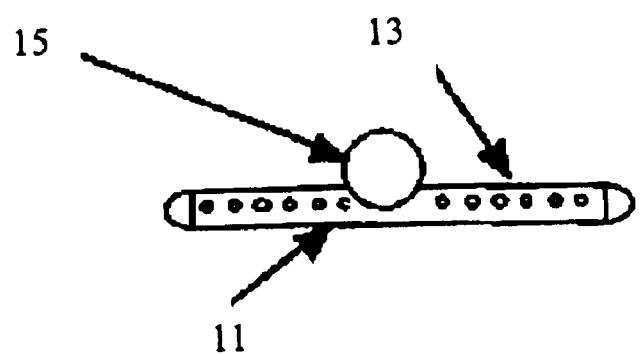
FIG. 2 represents an end cross-sectional view of another embodiment of an expandable array according to the present invention in a deployed state.
Figure 3:
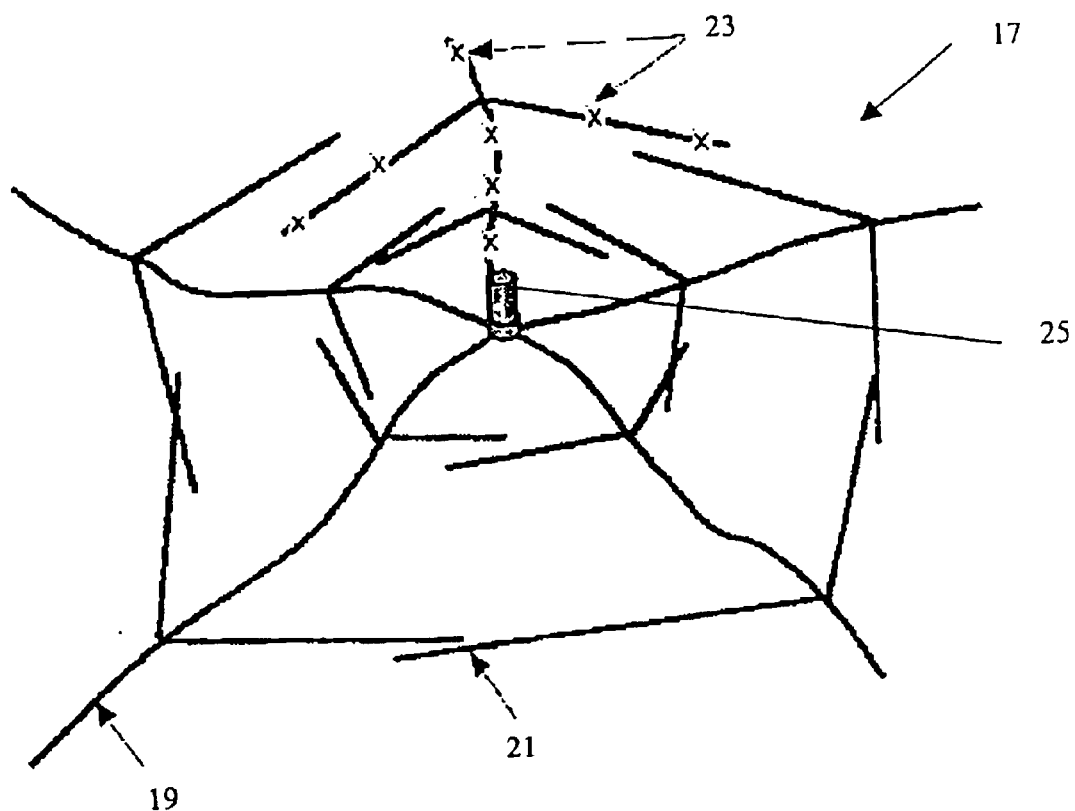
FIG. 3 represents a perspective view of another embodiment of an expandable array according to the present invention in a deployed state.

On the other hand, FIG. 2 illustrates an expandable member 11 having a flattened cross-section. A large area of inertia in one plane may aid in expanding the array in a desired geometry. The expanded element is attached to a flattened base section that keeps a long coiled array stable as it unrolls.

Figure 4:
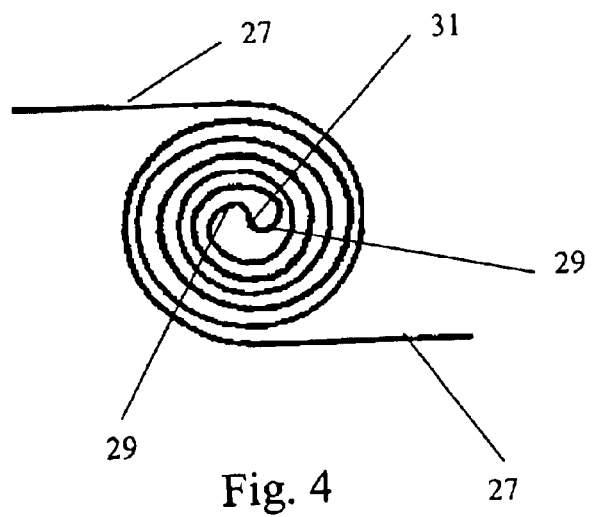
FIG. 4 represents a side view of another embodiment of an expandable array according to the present invention as deployment commences.

Regardless of how the expandable members expand, they may be stowed in a variety of ways. For example, the expandable members may be rolled. The expandable members may also be folded. If folded or rolled, the expandable members may be folded or rolled in any manner that permits them to be unfolded or unrolled. In some embodiments, multiple ends or multiple expandable members may be rolled or folded together. FIG. 4 illustrates an embodiment that includes ends 29 of branch expandable members 27 attached to the same trunk member 31. The two branch members are wound about the trunk member so that the two ends extend in opposite directions during the expansion. Some embodiments include accordion-like expandable members. A spiral configuration could also be used. However, any configuration may be used that permits an expandable member to be stowed and moved to an expanded deployed state.

To control the expansion of the expandable members, the expandable members may include one or more roll restrictors. The roll restrictors may help to control the rate that an expandable member unrolls, unfolds, or otherwise moves between a stowed state and a deployed state. This can help to assure that an array will take on a desired configuration when deployed. For example, the rate restrictors could help to limit kinking of an expandable member as well as to help ensure that the expandable members do not become ensnared on any obstacles on a surface that an array is set up on.

Roll restrictors may be arranged anywhere in and/or on an expandable member so as to function to control the expansion of the expandable member. Along these lines, roll restrictors may be arranged on at least a portion of an exterior surface of an expandable member. Roll restrictors may also be arranged on an interior surface or within the interior of an expandable member.

The roll restrictors may be made of any material(s) that would act against the tendency of the expandable members to expand to a degree that the expandable members will still expand but at a rate slower than if the expandable member did not include any roll restrictor(s). A simple implementation of a restrictor could include two pinch rollers of a metal and/or nonmetallic material. A spring mechanism could clamp the expandable member between the rollers. Spring force and/or friction on the rollers and roller axles could limit the rate that the inflation medium travels down the expandable member. The restriction could maintain a relatively high pressure of the inflation medium.

The embodiment shown in FIG. 1 includes roll rate restrictors 3 attached to the expandable member, which is shown in a rolled up, unexpanded state 1 and a deployed, expanded state 2.

Supporting elements may be arranged inside and/or outside expandable members for supporting the sensors or other devices attached to the array. For example, as in the embodiment shown in FIG. 1, an internal ribbon cable or flexible board 5 could be arranged within an expandable member. The internal ribbon cable or flexible board could be attached to interior walls of the expandable member. Sensors or other devices 7 could be arranged on or in connection with the internal ribbon cable or flexible board. The embodiment shown in FIG. 1 also includes an auxiliary sensor 9. This device could serve as a hub when unrolling the array. The hub may provide room for a sensor larger than what can within the coiled array. The hub mounted device may become a point sensor upon completion of the array expansion.

The sensors may be operatively connected to each other with a wired or wireless connection. Similarly, the sensors may be operatively connected to a processor or some other controller with a wired or wireless connection. If the connections among the sensors and between the sensors and a processor are wired, the wired connections may also be arranged on the internal cable, ribbon cable or flexible board. The sensors and wired connections could be attached in any manner, such as with adhesive, soldering, clips or other mechanical means, or any other suitable means. FIG. 2 illustrates a plurality of cables 13 operative to connect the sensors to each other.

Sensors may be attached to the exterior of the expandable members, embedded in the surface, and/or arranged anywhere within the interior of the expandable members.

The present invention may include a controller. The controller may be arranged on the array and/or remote from the array. For example, the controller may be arranged on a ship, a platform, and/or other element. The controller(s) may control operation of the sensors, expansion of the array, and/or any other function. Any suitable controller, such as a microcomputer, may be employed. The controller(s) will be operatively connected to the sensors, inflation means, and/or any other element that the controller(s) controls.

To power the sensors, controller, expansion means, such as a pump, and/or any other elements requiring power, the present invention may include a power source. The power source would be operatively connected to any element that it powers. Any suitable power source may be employed, such as batteries, gas generator, internal combustion engine and/or another power source. The power source may be located on the array, near the array, such as on the ocean floor, and/or on a ship, platform, the ground, in space or elsewhere and operatively connected to elements on and/or separate from the array that require power.

An array according to the present invention may be linear and include a single expandable member. FIG. 2 illustrates an example of such an embodiment. Alternatively, the array may be two-dimensional or three-dimensional. A two-dimensional array may include any number of branches and/or a plurality of trunks. The branches may extend from the trunks. FIG. 3 illustrates an embodiment of a two-dimensional array 17 that includes a plurality of trunks 19 and a plurality of branches 21 that extend from each trunk. A plurality of sensors 23 are attached to the trunks and the branches. Typically, all of a two-dimensional array lies in a single plane. However, variations in a surface that a two-dimensional array is deployed on or forces such as air and/or water currents could cause a two-dimensional array to not lie entirely in a single plane. The array may take on a defined multidimensional shape as the components expand.

A three-dimensional array includes expandable members that lie in more than one plane. For example, the array shown in FIG. 7 could include expandable members that extend above the plane in which the two-dimensional array lies. Different array configurations can provide the array with various functionalities. Flexibility in array shape can permit optimization of properties. For example, where the array forms an antenna, the shape of the expanded array may be optimized to maximize array gain characteristics.

The overall dimensions of an array according to the present invention may vary typically from about a few feet to hundreds of feet or more. The size may vary depending upon a number of factors, such as water column conditions, seabed conditions, choice of materials, among others.

Figure 10:
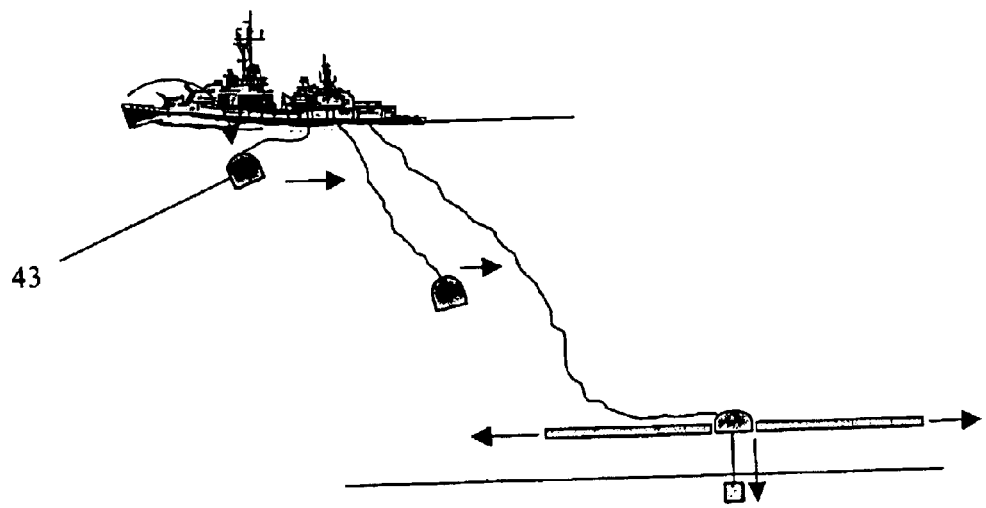
Figure 12:
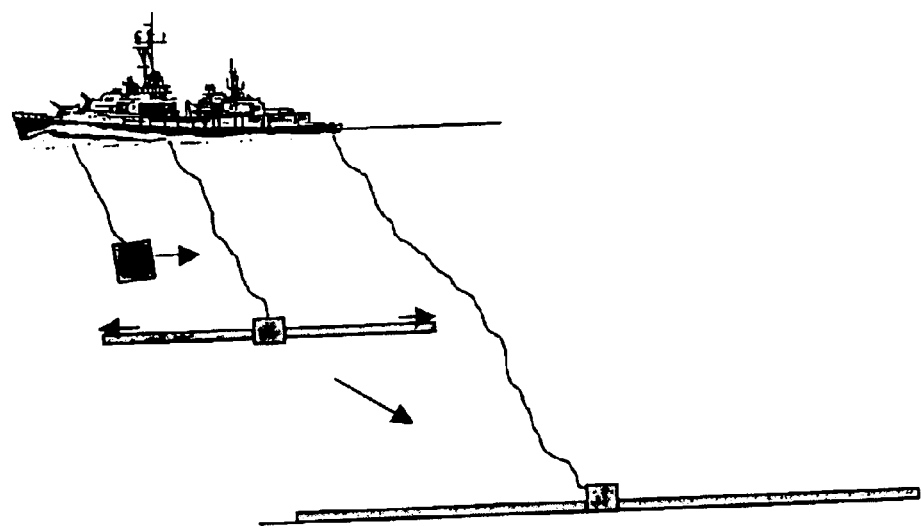

An array according to the present invention may be static or mobile once deployed. In the event that the array is static, it could include one or more anchors operative to help maintain the array in one position. The anchor could be arranged on the sea floor, for example. FIGS. 10 and 12 illustrate embodiments of the present invention that include an anchor. If the array were filled with lighter than air gas and deployed floating in the air, the anchor could be arranged on the surface of the earth. The array could be attached to at least one tether that could connect the array to the anchor(s). Alternatively, the tether could connect the array to a moveable body, such as a ship that could help hold the array stationary or permit the array to be moved about.

Figure 5:
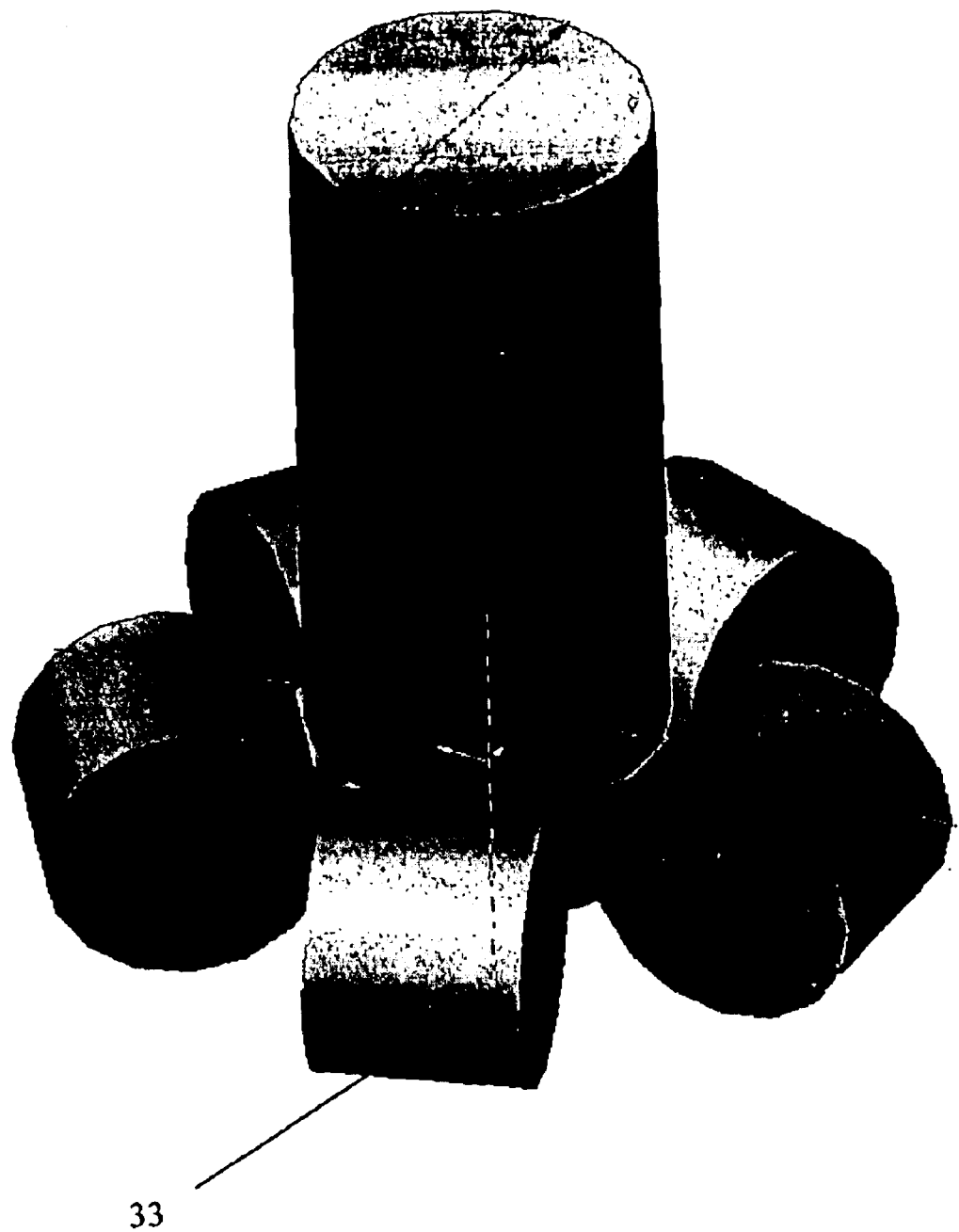
FIG. 5 represents a perspective view of another embodiment of an expandable array according to the present invention prior to deployment.
Figure 6:
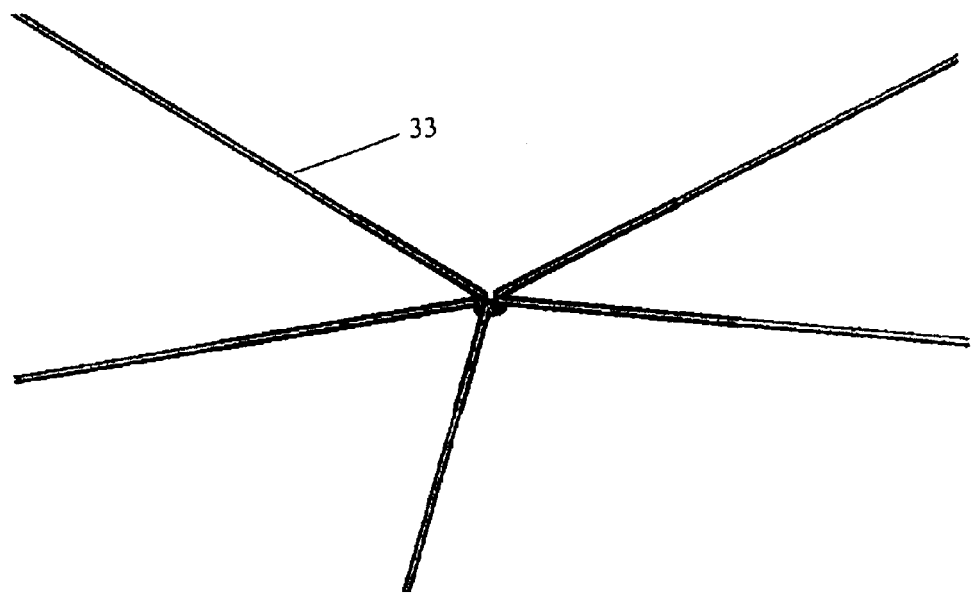
FIG. 6 represents a perspective view of the embodiment of the array shown in FIG. 5 subsequent to deployment.
Figure 7:
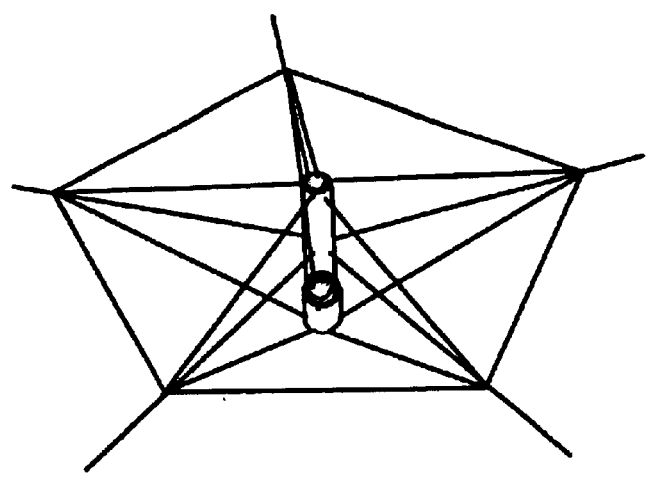
FIG. 7 represents a perspective view of a portion of an expandable member of the embodiment shown in FIGS. 5 and 6.

The present invention may include a storage container for storing the expandable members in a stowed state. FIG. 3 illustrates an embodiment of a storage container 25. FIG. 5 illustrates an embodiment of the present invention in a stowed, unexpanded state. The embodiment includes five expandable members 33 that will unroll like party favors upon being filled with water. The central array hub could contain sensor electronics, power storage, communication equipment, inflation equipment, among other elements. FIG. 6 illustrates the embodiment shown in FIG. 5 with the expandable members in a deployed state. FIG. 7 illustrates a perspective view of a three-dimensional embodiment of the array shown in FIG. 5.

Figure 8:
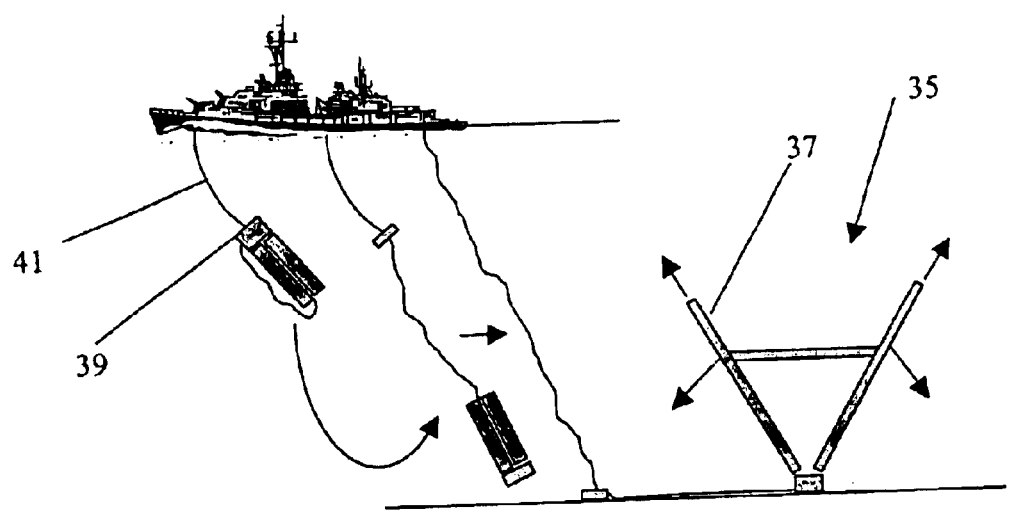
FIGS. 8–13 represent schematic views of deployment of a number of embodiments of arrays according to the present invention.

FIGS. 8–14 illustrate various embodiments of undersea arrays according to the present invention and various strategies for deploying the arrays. For example, FIG. 8 illustrates a base towed array 35 with composite arms 37. This array would be towed into position by its base 39. It is designed to be partially embedded in the sea floor upon impact. The embodiment includes a trailing tether 41. The undeployed array would be released and then contact the sea bed. The arms would extend upward and then fall to contact the sea floor. According to one particular embodiment, the stowed array is about twenty-five feet long and has a diameter of about six feet. The expanded arms could have a length of up to about 400 feet. Such an embodiment could result in very straight arms and reduced stress on the arms. Expanded members, such as those shown in FIG. 4, forming cords between the main arms, may aid in controlling the array shape and provide additional stability. Sensors mounted on and/or in the cords could also be employed with this embodiment to enhance the array performance through improved antenna gain, high and low frequency pick-up.

Figure 9:
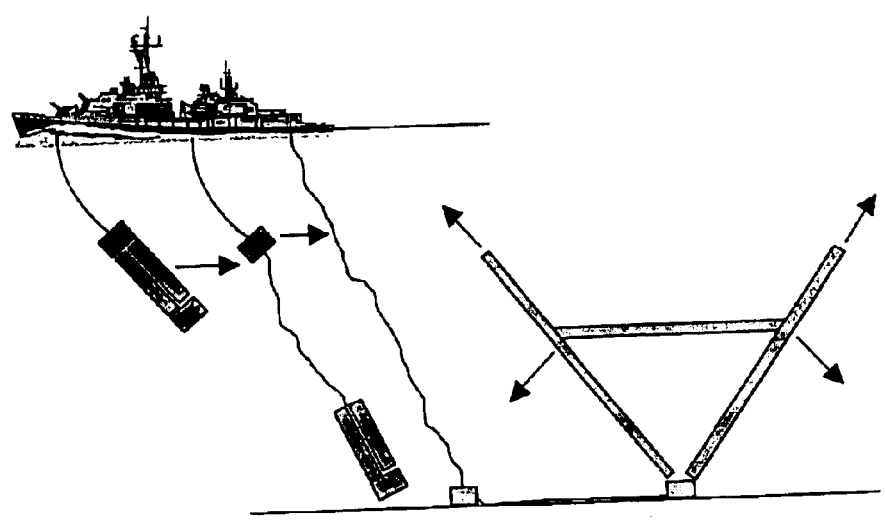

FIGS. 8 and 9 illustrate similar embodiments of deployed arrays. During deployment, the embodiment shown in FIG. 8 may flip over when released from a towing cap. On the other hand, the embodiment shown in FIG. 9 may drop straight off. In both cases the cap may drop to the bottom to form an anchor. As the array deploys, cable may spool from the cap anchor and the ship. The cable to the ship can provide power and/or signal conductors, among other functions.

Figure 11:
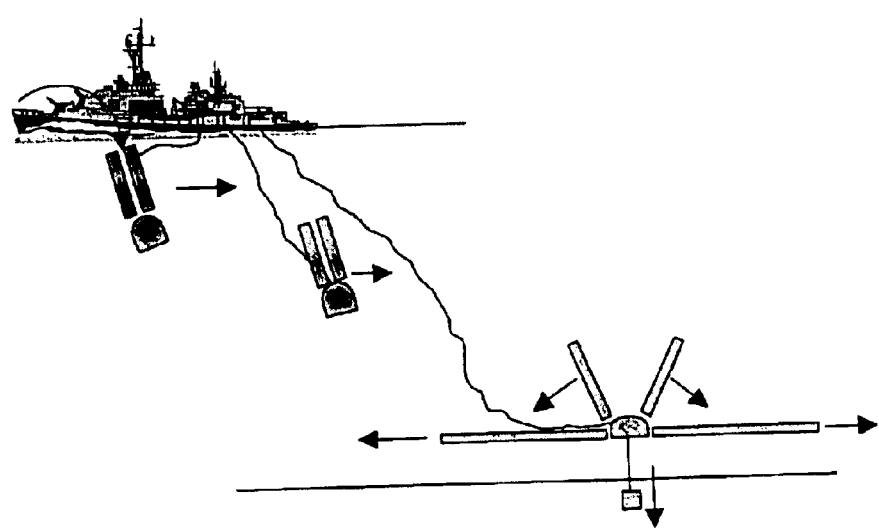

FIG. 10 illustrates an embodiment of the present invention that includes a capsule array. The array is stowed in a capsule 43 that may be towed or dropped. This embodiment includes an anchor 45 that is dropped and hopefully is embedded in the sea floor. The expandable members are rolled and may unroll upon reaching a depth about ten to about 30 feet above the sea floor. This embodiment provides a stable compact package the can deploy near the sea floor, away from most currents and away from obstacles that may be present on the sea floor. FIG. 11 illustrates a capsule array that includes composite arms. This embodiment may be designed to rest on the sea floor.

FIG. 12 illustrates another embodiment of a capsule array. This embodiment does not include an anchor and is designed to rest on the sea floor. The arms of this embodiment expand prior to the array coming to rest on the sea floor.

Figure 13:
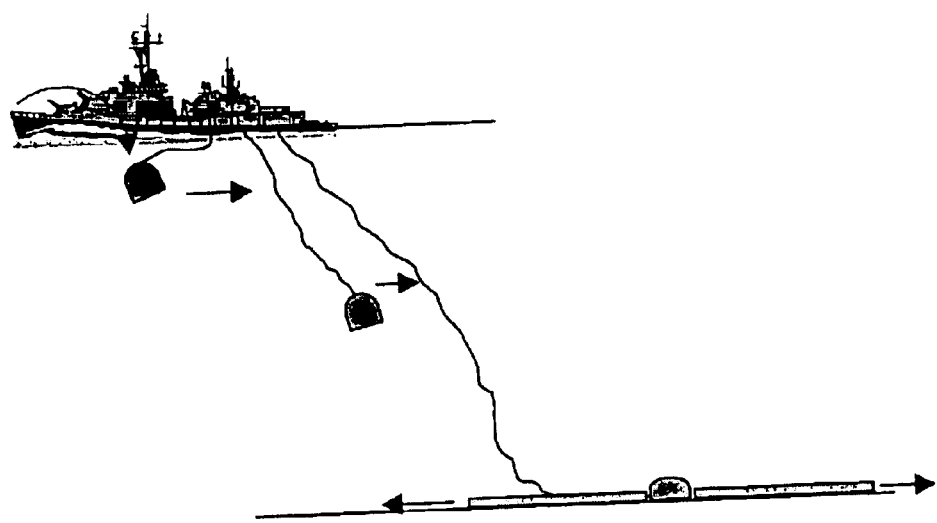

FIG. 13 illustrates another embodiment of a capsule array. This embodiment does not include an anchor and is designed to rest on the sea floor. The arms of this embodiment unroll onto the sea floor away from currents.

We claim:

1. An expandable sensor array, comprising:
   at least one expandable member movable between an unexpanded stowed state and an expanded deployed state, wherein the at least one expandable member comprises a self-hardening material; and
   a plurality of sensors interconnected with the at least one expandable member and operatively connected to form a sensor array.

2. The array according to claim 1, wherein the at least one expandable member is inflatable.

3. The array according to claim 2, further comprising:
   at least one inflating member operable to deliver at least one inflating fluid to the at least one inflatable member.

4. The array according to claim 3, wherein the at least one inflating member comprises at least one pump.

5. The array according to claim 3, wherein the at least one inflating fluid comprises at least one gas.

6. The array according to claim 3, wherein the at least one inflating fluid comprises at least one liquid.

7. The array according to claim 3, wherein the at least one inflating member comprises at least one gas pump.

8. The array according to claim 3, wherein the at least one inflating member comprises at least one gas generator.

9. The array according to claim 1, wherein the at least one expandable member comprises open-celled materials that are self-expandable when released from a compressed state.

10. The array according to claim 1, wherein the sensors are mounted within the at least one inflatable member.

11. The array according to claim 1, wherein the sensors are mounted on the at least one inflatable member.

12. The array according to claim 1, wherein the sensors are embedded within a wall of the at least one inflatable member.

13. The array according to claim 1, wherein in a stowed state the at least one expandable member is rolled, and wherein the at least one expandable member is moved from the stowed position to the deployed position by unrolling.

14. The array according to claim 13, further comprising:
   at least one roll rate restrictor operatively connected to the at least one expandable member to control a rate that the at least one expandable member unrolls.

15. The array according to claim 1, wherein the at least one expandable member comprises an accordion-shaped member, and wherein the at least one expandable member is moved from the stowed position to the deployed position by expanding the accordion-shaped member.

16. The array according to claim 15, further comprising:
   at least one expansion restrictor operatively connected to the at least one expandable member to control a rate that the at least one expandable member expands.

17. The array according to claim 1, further comprising:
   a power source operable to power elements of the array arranged within or outside the array.

18. The array according to claim 1, further comprising:
   at least one sensor support arranged within the at least one expandable member, the sensors being arranged on at least one sensor support.

19. The array according to claim 1, wherein the array comprises a linear array.

20. The array according to claim 1, wherein the array comprises a two-dimensional array.

21. The array according to claim 1, wherein the array comprises a plurality of trunks and a plurality of branches extending from each trunk.

22. The array according to claim 1, wherein the sensors comprise at least one of acoustic and non-acoustic sensors.

23. The array according to claim 1, wherein the sensors comprise at least one of hydrodynamic, geologic, and biologic sensors.

24. The array according to claim 1, wherein the sensors comprise at least one of hydrophones, thermistors, pressure sensors, accelerometers, and geophones.

25. The array according to claim 1, wherein in an expanded state the at least one expandable member has a circular cross-section.

26. The array according to claim 1, wherein in an expanded state the at least one expandable member is widest at its base.

27. The array according to claim 1, wherein the at least one expandable member is inflatable, the array further comprising:
   an inflation tube operatively connected to the expandable member for delivering inflating medium to the expandable member.

28. The array according to claim 1, further comprising:
   a source of inflating medium connected to the at least one expandable member.

29. The array according to claim 1, further comprising:
   an auxiliary sensor connected to the at least one expandable member.

30. The array according to claim 1, wherein the array is operative for use on a submerged surface.

31. The array according to claim 1, wherein the array is operative for use floating underwater.

32. The array according to claim 1, wherein the array is operative for use in space.

33. The array according to claim 1, wherein the array is operative for use on land.

34. The array according to claim 1, wherein the array is operative for use floating on a surface of a body of water.

35. The array according to claim 1, wherein the array is operative for use floating in air.

36. The array according to claim 1, wherein the array comprises a three-dimensional array.

37. The array according to claim 1, further comprising:
a controller operative to control at least one of operation of the sensors and moving the at least one expandable member between the unexpanded stowed state and the expanded deployed state.

38. The array according to claim 1, wherein the array is operative for static use.

39. The array according to claim 1, wherein the array is operative for mobile use.

40. The array according to claim 1, wherein the array forms an antenna.

41. The array according to claim 1, further comprising:
at least one anchor operatively connected to the array to retain the array in a stationary position.

42. The array according to claim 1, further comprising:
at least one tether operative to move the array with the at least one expandable member in the unexpanded stowed state or in the expanded deployed state.

43. The array according to claim 1, wherein the at least one expandable member comprises a sea water soluble material.

* * * * *